United States Patent Office 3,548,018
Patented Dec. 15, 1970

3,548,018
SELECTIVE PRODUCTION OF STILBENES AND/OR BIBENZYLS BY THE COUPLING OF TOLUENES
Madan Mohan Bhasin, Charleston, and Kenneth Dale Williamson, St. Albans, W. Va., assignors to Union Carbide Corporation, New York, N.Y., a corporation of New York
No Drawing. Filed Dec. 27, 1968, Ser. No. 787,556
Int. Cl. C07c 15/18
U.S. Cl. 260—670                    18 Claims

ABSTRACT OF THE DISCLOSURE

Toluene and certain substituted toluenes are coupled using elemental sulfur as the coupling agent. Higher ratios of stilbene to bibenzyl are obtained when the coupling reaction of toluene is conducted at higher toluene-to-sulfur ratios and by the removal of hydrogen sulfide from the reaction zone. Also, higher ratios of bibenzyl to stilbene are realized by conducting the coupling reactions at lower toluene-to-sulfur ratio and in the presence of added hydrogen sulfide.

---

This invention relates to the production of stilbene and bibenzyl by the coupling reaction of toluene using elemental sulfur and is also related to the production of substituted stilbene and substituted bibenzyl by the coupling reaction of substituted toluenes using elemental sulfur. In its particular aspect this invention is concerned with the selective production of stilbene and/or bibenzyl by the coupling reaction of toluene using elemental sulfur as the coupling agent.

The coupling of toluene by reaction with sulfur has been reported by Renard, Bull. Soc. Chim. 3, 958 (1889); 5, 278 (1891). This publication discloses the coupling reaction of toluene using elemental sulfur under the influence of heat. Horton, J. Org. Chem., 14, 761 (1949) discusses the types of products which are formed by the coupling reaction of toluene using elemental sulfur as the coupling agent, and explains the mechanism of the reaction.

The coupling reaction of substituted toluene has also been reported. For example, Toland, Wilkes and Brutschig, J. Am. Chem. Soc., 75, 2263 (1953) discloses the coupling reaction of the p-toluic acid with sulfur to produce 4,4'-stilbenedicarboxylic acid. Furthermore, Toland and Wilkes have also reported the coupling reaction of p-toluic acid with sulfur to produce 4,4-bibenzyldicarboxylic acid in J. Am. Chem. Soc., 76, 307 (1954).

In a commonly assigned copending application, the inventors therein disclose a process for the production of ethylbenzene and benzene using toluene as the starting hydrocarbon raw material. The first principal reaction step disclosed therein involves the coupling reaction of toluene under the influence of heat, using elemental sulfur as the coupling agent. The products of the coupling reaction, i.e., bibenzyl, stilbene, sulfur-containing as well as sulfur-free by-products are then subjected to a hydrotreating operation to produce ethylbenzene and benzene as the major products.

Thus, while the coupling reaction of toluene has been known for a long period of time, there is no information regarding selective production of stilbene and/or bibenzyl by such reaction. In the aforesaid commonly assigned copending application, it is disclosed that the combined production of bibenzyl and stilbene can be maximized during the toluene coupling reactions under certain conditions. However, no effort is made to alter the relative amounts of these products. In fact the ultimate objective of the applicants therein is achieved regardless of the relative amounts of stilbene and bibenzyl so long as their combined production is maximized so as to constitute the major portion of the products of the coupling reaction.

It has now been discovered that the coupling reaction of toluene using element sulfur can be effected under certain specific reaction conditions to thereby control the relative amounts of stilbene and bibenzyl in the products of the coupling reaction. It has specifically been discovered that the relative amounts of stilbene and bibenzyl produced by such reaction can be varied by varying the toluene-to-sulfur ratio and by the removal of hydrogen sulfide formed by this reaction as will hereinafter be described.

Stilbene is a relatively unexplored monomer which can be copolymerized with acrylonitrile and the resulting copolymer employed for a variety of applications such as molding, extrusion, and film and glass reinforced resin binders. The copolymerization of stilbene was reported by K. Kozaki, Journal of Polymer Sciences, 1, pp. 455–456 (1946) and other reactions of stilbene have been variously reported in the available literature.

Broadly, and in its broadest aspect, the process of this invention comprises the coupling reaction of toluene and substituted toluenes, in the liquid phase and under the influence of heat, using elemental sulfur as the coupling agent. The reaction conditions are judiciously selected so as to produce a predetermined ratio of stilbene to bibenzyl.

The coupling reactions of toluene using sulfur as the coupling agent may be represented by the following equations:

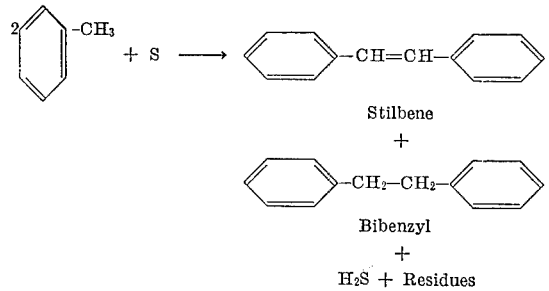

The reaction products are basically stilbene and bibenzyl. The residues formed generally consist of some sulfur-containing compounds and some sulfur-free compounds. The sulfur-containing by-products are generally complex aromatic compounds such as the derivatives of thiophenes, e.g., 2-phenylbenzothiophene. The other by-products formed include dibenzylsulfide, o-bitolyl, 1,2,3-triphenylpropane and 1,2,3,4-tetraphenylbutane.

The coupling reaction is carried out in the liquid phase and under the influence of heat. The upper temperature limit of the reaction is dictated by the critical temperature of toluene, or the particular substituted toluene which is employed as the reactant. Thus, the reaction temperature can vary from about 250° C. to about the critical temperature and is preferably from about 280° C. to about the critical temperature. The terms "critical temperature" as employed herein has reference to the critical temperature of the particular reactant (toluene or substituted toluene) which is employed. In the case of toluene, for example, the upper temperature limit of the reaction is 318.6° C. which is the critical temperaure of toluene.

The pressure per se is not narrowly critical in this invention so long as the reactants are maintained in the liquid phase. Generally, the minimum pressure at which the reaction may be convenienty carried out at least is about the vapor pressure of the hydrocarbon starting material, i.e., toluene or substituted toluene. Pressures as high as about 2,000 p.s.i.g. or even higher can be employed though there is no real advantage in carrying out this reaction at higher pressures.

The residence time of the coupling reaction of this invention should be sufficient to consume essentially all the elemental sulfur in the reactions. Thus, at least several minutes are generally required for this purpose and for most practical cases a residence time of from about 5 minutes to about 2 hours has been found to be sufficient for the consumption of essentially all the elemental sulfur in the reaction.

The toluene-to-sulfur ratio employed is critical and depends on the relative amounts of stilbene and bibenzyl which are desired. While the maximum combined production of stilbene and bibenzyl can be obtained at a toluene-to-sulfur ratio of at least about 2:1 moles of toluene per gram atom of sulfur, as a practical matter this ratio is preferably from about 4:1 to about 20:1 moles of toluene per gram atom of sulfur. It has been generally discovered, however, that the higher the toluene-to-sulfur which is employed, other reaction conditions being essentially the same, the higher is the stilbene-to-bibenzyl ratio in the reaction products. Conversely, the lower the ratio of toluene-to-sulfur, the lower is the stilbene-to-bibenzyl ratio in the reaction products.

It has now been specifically discovered that a stilbene-to-bibenzyl ratio of about 1 is obtained at the aforesaid reaction conditions by using a toluene-to-sulfur ratio of about 12:1 to about 14:1. Stilbene-to-bibenzyl ratios of greater than about 1 are obtained when the toluene-to-sulfur ratio is greater than about 14:1 and is preferably from about 14:1 to about 20:1. Similarly, bibenzyl-to-stilbene ratio of greater than about 1 will be obtained when the toluene-to-sulfur ratio is less than about 12:1 and is preferably from about 2:1 to about 12:1.

It has further been unexpectedly discovered that the ratio of stilbene-to-bibenzyl in the reaction products can be increased by the removal of hydrogen sulfide from the reaction zone. The more rapid the removal of hydrogen sulfide from the reaction zone, the higher the ratio of stilbene-to-bibenzyl which is produced. When higher ratios of bibenzyl to stilbene are desired, it is not necessary to remove the hydrogen sulfide produced during the coupling reaction since hydrogen sulfide is found to react with stilbene to produce bibenzyl according to the following equilibrium reaction.

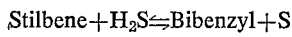

Stilbene+H₂S⇌Bibenzyl+S

Alternatively, if higher ratios of bibenzyl-to-stilbene are desired, the coupling reaction may be carried out in the presence of added hydrogen sulfide.

It was previously pointed out that higher stilbene-to-bibenzyl ratios are realized at higher toluene-to-sulfur ratios. Thus, stilbene-to-bibenzyl ratios of greater than about 1 are obtained when the toluene-to-sulfur ratio is from about 14:1 to about 20:1 and stilbene-to-bibenzyl ratios of less than about 1 are realized when the toluene-to-sulfur ratio is from about 2:1 to about 12:1. However, it has now also been discovered that stilbene-to-bibenzyl ratios larger than about 1 can be obtained even when employing a toluene-to-sulfur ratio of from about 2:1 to about 12:1 by removal of hydrogen sulfide from the reaction zone. For example, it is possible to achieve such greater stilbene-to-bibenzyl ratios at a toluene-to-sulfur ratio of say, about 4 or 5 by the removal of hydrogen sulfide from the reaction zone. Thus, the rate of removal of hydrogen sulfide and the toluene-to-sulfur ratio are somewhat interdependent and the optimum toluene-to-sulfur ratio and the rate of removal of hydrogen sulfide from the reaction zone can be determined in each case by those skilled in the art depending upon the reaction system which is employed.

The coupling reactions of this invention may be carried out continuously, semi-continuously or in batchwise manner. In continuous operation, the requisite amount of sulfur is dissolved in toluene and the resulting solution is then introduced into a reaction zone where the coupling reaction is conducted at the desired reaction conditions. The reaction products are continuously removed and subjected to a product recovery section where hydrogen sulfide is recovered, converted back to elemental sulfur by known procedures and then recycled to the reaction zone if desired. The hydrogen sulfide-free reaction products may then be subjected to a first distillation operation to recover unreacted toluene which may also be recycled to the reaction zone. Stilbene and bibenzyl may thereafter be recovered by distillation, extraction, or any other similar procedure.

It must be further pointed out at this point that higher stilbene-to-bibenzyl ratios may also be obtained by recycling bibenzyl to the reaction zone. Thus, the bibenzyl produced during the coupling reaction may be recovered from the reaction products and recycled for further reaction with sulfur to thereby produce more stilbene.

The coupling reaction of this invention will now be illustrated by the following examples.

EXAMPLE 1

A mixture of toluene and sulfur (9 moles of toluene per one gram atom of sulfur) was charged to a one-liter autoclave and the autoclave was then sealed and purged with nitrogen until all the air was removed therefrom. The mixture was heated to 300° C. and 670 p.s.i.g. (combined pressure of nitrogen and toluene) and maintained at this temperature for 120 minutes during which time the pressure was observed to increase to 735 p.s.i.g. Thereafter, the reaction mixture was rapidly cooled to ambient temperature and the hydrogen sulfide produced by the reaction was purged with nitrogen. The reaction effluent was scrubbed with cadmium sulfate to quantitatively remove the hydrogen sulfide. Thus, the weight of hydrogen sulfide produced in this reaction was determined by increase in the weight of the scrubber and by the amount of sulfuric acid formed by the reaction of hydrogen sulfide and cadmium sulfate as follows:

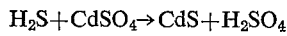

H₂S+CdSO₄→CdS+H₂SO₄

The liquid content of the autoclave was withdrawn, distilled into several fractions, weighed and analyzed by vapor-phase chromatography. The experimental conditions employed and the results obtained in this example as well as in Examples 2–5 are shown in Tables I and II, respectively.

TABLE I.—EXPERIMENTAL CONDITIONS

| | Reaction time, min. | Toluene-to-sulfur ratio, moles/gram atom | Temp., ° C. | Pressure, p.s.i.g. | Nitrogen purge cc./min. |
|---|---|---|---|---|---|
| Example: | | | | | |
| 1 | 120 | 9.0 | 300 | 670–735 | None |
| 2 | 120 | 9.0 | 300 | 550 | 100 |
| 3 | 82 | 9.0 | 300 | 450 | 300–3,000 |
| 4 | 120 | 4.2 | 300 | 690–857 | None |
| 5 | 175 | 4.5 | 300 | 550 | 87 |

TABLE II.—EXPERIMENTAL RESULTS

| Ex. | Toluene conversion,[1] weight, percent | Efficiency, weight percent [2] | | | Stilbene-to-bibenzyl ratio |
|---|---|---|---|---|---|
| | | Stilbene | Bibenzyl | Residues | |
| 1 | 15.5 | 13.1 | 63.0 | 23.9 | .21 |
| 2 | 13.0 | 24.5 | 53.0 | 22.5 | .46 |
| 3 | 10.4 | 47.4 | 24.2 | 28.4 | 1.96 |
| 4 | 26.2 | 7.1 | 54.1 | 38.8 | .13 |
| 5 | 26.3 | 14.3 | 51.7 | 34.0 | .36 |

[1] Determined by distillation of a known weight of the products.
[2] Calculated as follows:

Weight percent efficiency =
$$\frac{\text{weight percent of compound in the total recovered product}}{\text{weight percent conversion of toluene}} \times 100$$

EXAMPLES 2 AND 3

The procedure used in these examples was essentially the same as in Example 1 except that the contents of the autoclave were purged with nitrogen during the reaction. The rates of purge in Examples 2 and 3 were 100 cc./min. and 300–3,000 cc./min., respectively.

EXAMPLE 4

The procedure used in this example was essentially the same as in Example 1 except that 4.2 moles of toluene was used per gram atom of sulfur.

EXAMPLE 5

The procedure used in this example was essentially the same as in Example 1 except that the toluene-to-sulfur ratio was 4.5, the reaction time was 175 minutes and the content of the reactor was purged with nitrogen at the rate of 87 cc./min.

It is noted from the foregoing tables that higher ratios of stilbene-to-bibenzyl can be achieved by using higher toluene-to-sulfur ratio as is evident from a comparison of Examples 1 and 4. It is further noted that the removal of hydrogen sulfide from the reaction zone also results in higher stilbene-to-bibenzyl ratio in the reaction products. This is clearly demonstrated by the results obtained in Examples 1, 2 and 3 which were conducted at essentially the same conditions except for the use of purge in the latter two examples. Similar conclusion is reached by a comparison of Examples 4 and 5. In this connection, it must be pointed out that the higher the purge rate, the more rapid is the removal of hydrogen sulfide from the reaction zone, and consequently the higher is the ratio of stilbene-to-bibenzyl which is produced. This is clearly evident from a comparison of Examples 2 and 3.

From the foregoing tables, it will be noted also that the only example in which the ratio of stilbene-to-bibenzyl in the reaction products exceeded unity is Example 3 in which the reactor contents were purged with nitrogen. However, such higher ratios of stilbene-to-bibenzyl can also be obtained without nitrogen purge by using higher toluene-to-sulfur ratios in the reaction zone as will be illustrated by the following Examples 6 and 7.

EXAMPLES 6 AND 7

The procedure used in this example was essentially the same as in Example 1, except that the toluene-to-sulfur ratio employed were 30 and 60, respectively. The reaction temperature was 300° C. and the reaction time was 20 minutes. The stilbene-to-bibenzyl mole ratio in the reaction products were 3.5 in Example 6 and 7.9 in Example 7.

Thus, it is apparent that as the toluene-to-sulfur ratio is increased, the stilbene-to-bibenzyl ratio in the reaction products is also increased. Accordingly, any predetermined amount of stilbene and bibenzyl can be obtained by varying the toluene-to-sulfur ratio. Furthermore, higher stilbene-to-bibenzyl rate can also be achieved by the removal of hydrogen sulfide from the reaction zone and the more rapid is the removal rate of hydrogen sulfide, the higher is the ratio of stilbene-to-bibenzyl in the reaction products.

As was previously mentioned, more stilbene may be produced by recycling to the reaction zone part or all the bibenzyl which is formed in this reaction. This will be illustrated by Example 8 below.

EXAMPLE 8

Four grams of sulfur was dissolved in 48 grams of bibenzyl and the solution was heated in a glass flask to 270–284° C. for about 30 minutes. The hydrogen sulfide which was formed during the reaction was continuously vented from the reaction flask.

Approximately 42 percent bibenzyl was converted to stilbene with a corresponding 80 percent moles sulfur efficiency. Thus, this example demonstrates that bibenzyl can be recycled to the coupling reaction zone in order to produce more stilbene.

The foregoing examples illustrated the coupling reaction in batchwise manner. However, this reaction may also be effected in a continuous manner as illustrated by Example 9 below.

EXAMPLE 9

One mole of sulfur was dissolved in 10 moles of toluene and the resulting solution was fed to the top of a reactor at a liquid hourly space velocity (LHSV) of 1.5. The reactor was one inch stainless steel tube, 32 inches long and packed with Filtros packing. The reaction was carried out at 290° C.–305° C. and 1450 p.s.i.g. while continuously purging the contents of the reactor with a countercurrent stream of nitrogen at the rate of 300 cc./minute.

The toluene conversion in this example was 5.3 weight percent and the ratio of stilbene to bibenzyl was 2.6. When the nitrogen purge rate was increased to 750 cc./minute the stilbene-to-bibenzyl ratio was increased to about 6. Indicating once again that the more rapid is the hydrogen sulfide removal from the reaction zone the higher is the ratio of resulting stilbene-to-bibenzyl in the reaction products.

While the coupling reaction of this invention has heretofore been described and illustrated using toluene as the starting hydrocarbon material, it must be pointed out that this reaction is also applicable to substituted toluenes in which the aromatic nucleus is substituted in at least one other position. The substituents must be stable during the reaction and remain attached to the aromatic nucleus, must not promote a significant competitive coupling reaction (which otherwise destroys the selectivity of the reaction) and must not inhibit the desired coupling reaction.

Exemplary suitable substituents include methyl group. halogen such as chlorine, bromine and iodine, nitro group, carboxylic acid group, aromatic and fused aromatic groups, etc. One or more such substituents may be present and in all cases the substituent is attached to the carbon atom of the aromatic nucleus.

Exemplary substituted toluenes which can also be coupled by the coupling reaction described herein include xylenes, chlorotoluenes, etc. Analogous aromatic compounds such as methyl pyridine can also be coupled by this reaction.

In general, any methyl group-containing compound having the general formula X—$CH_3$ can be reacted by the process of this invention. X is in generally an aryl group or a substituted aryl group having at least one substituent of the type heretofore described. The following examples serve to illustrate the application of the coupling reaction of this invention to some of the well-known substituted toluenes.

EXAMPLE 10

The substituted toluene in this example was o-xylene.

8.85 gram of sulfur (0.27 moles) was dissolved in 263.5 grams (2.4 moles) of o-xylene and the resulting solution was charged to an autoclave, and the autoclave was sealed and purged with nitrogen to remove all the air therefrom. The autoclave was then heated and the reaction carried out at 300° C. and 385 p.s.i.g. for 30 minutes while purging nitrogen at the rate 500 cc./min. (measured at ambient conditions) in order to remove the hydrogen sulfide as it was formed during the reaction. The experimental procedure and product recovery techniques were essentially the same as in Example 1.

The efficiency to the coupled products in this example was 60.26 percent, the principal coupled products being 2,2′-dimethylbenzyl and 2,2′-dimethylstilbene. The material recovery was essentially 100 percent and the conversion of o-xylene was 8.62 percent. The ratio of 2,2′-dimethylbibenzyl to 2,2′-dimethylstilbene in the coupled products was 1.08.

EXAMPLE 11

The substituted toluene in this example was p-chlorotoluene.

A solution of 0.1 gram atom of sulfur in 1.0 mole of p-chlorotoluene was charged to an autoclave and reacted therein at 300° C. and 500 p.s.i.g. for 60 minutes.

The procedure employed in this example was the same as in the Example 1.

The conversion of p-chlorotoluene was 16 percent and the combined efficiency to the coupling products (based on p-chlorotoluene) was 60 percent. The principal coupling products were p,p-dichlorobibenzyl and p,p-dichlorostilbene having a ratio of 5:1 substituted bibenzyl and substituted stilbene.

It is noteworthy to indicate that this example suggests a procedure for preparing p,p′-dichlorobenzene and p,p′-dichlorostilbene from p-chloro toluene essentially in pure form. They are uncontaminated with their corresponding ortho and meta isomers.

The coupling reactions of substituted toluene are generally carried out at about the same conditions which were heretofore disclosed in connection with the coupling of toluene. However, it will be understood that the upper reaction temperature limit in such cases is the critical temperature of substituted toluene rather than toluene and hence depends upon the particular substituted toluene which is subjected to this reaction. Similarly, higher ratios of substituted stilbenes to substituted bibenzyls and vice versa can be obtained by effecting the reaction under the conditions which were described in connection with varying the stilbene-to-bibenzyl ratio.

As was previously stated, the removal of hydrogen sulfide from the reaction zone increases the ratio of stilbene-to-bibenzyl in the reaction products. It must be indicated however, that the removal of hydrogen sulfide from the reaction zone is not limited by physical means such as purging with nitrogen or some other inert gaseous material. Any chemical compound which consumes or eliminates hydrogen sulfide from the reaction zone without interference with the coupling reaction may be similarly employed.

What is claimed is:

1. A process for selective production of stilbene from toluene which comprises coupling toluene, using elemental sulfur as the coupling agent, at a temperature of from about 250° C. to about the critical temperature of toluene and wherein the ratio of the number of mols of toluene to the number of gram atoms of sulfur is about 14:1 to about 20:1.

2. A process for the selective production of bibenzyl from toluene which comprises coupling toluene, using elemental sulfur as the coupling agent, at a temperature of from about 250° C. to about the critical temperature of toluene and wherein the ratio of the number of mols of toluene to the number of gram atoms of sulfur is about 2:1 to about 12:1.

3. A process for the production of stilbene and bibenzyl in substantially equal amounts from toluene which comprises coupling toluene, using elemental sulfur as the coupling agent, at a temperature of from about 250° C. to about the critical temperature of toluene and wherein the ratio of the number of mols of toluene to the number of gram atoms of sulfur is about 12:1 to about 14:1.

4. The process of claim 1 wherein the hydrogen sulfide produced is removed during the reaction.

5. The process of claim 2 wherein the reaction is carried out in the presence of added hydrogen sulfide.

6. The process of claim 3 wherein hydrogen sulfide produced is removed during the reaction to thereby increase the ratio of stilbene to bibenzyl in the reaction products.

7. In a process for the production of stilbene and bibenzyl from toluene which comprises coupling toluene, using elemental sulfur as the coupling agent, at a temperature of from about 250° C. to about the critical temperature of toluene wherein the ratio of the number of mols of toluene to the number of gram atoms of sulfur is at least about 2:1, the improvement comprising removing the hydrogen sulfide produced during the reaction to thereby selectively increase the ratio of stilbene-to-bibenzyl in the reaction product.

8. The process of claim 7 wherein the ratio of the number of mols of toluene to the number of gram atoms of sulfur is about 4:1 to about 20:1.

9. A process for the selective production of substituted stilbene from substituted toluene which comprises coupling said substituted toluene, using elemental sulfur as the coupling agent, at a temperature of from about 250° C. to about the critical temperature of said substituted toluene and wherein the ratio of the number of mols of substittued toluene to the number of gram atoms of sulfur is about 14:1 to about 20:1.

10. A process for seiective production of substituted bibenzyl from substituted toluene which comprises coupling said substituted toluene, using elemental sulfur as the coupling agent, at a temperature of from about 250° C. to about the critical temperature of said substituted toluene and wherein the ratio of the number of mols of substituted toluene to the number of gram atoms of sulfur is about 2:1 to about 12:1.

11. A process for the production of substituted stilbene and substituted bibenzyl in substantially equal amounts from substituted toluene which comprises coupling said substituted toluene, using elemental sulfur as the coupling agent, at a temperature of from about 250° C. to about the critical temperature of said substituted toluene, and wherein the ratio of the number of mols of substituted toluene to the number of gram atoms of sulfur is about 12:1 to about 14:1.

12. The process of claim 9 wherein said substituted toluene is xylene or halo-toluene.

13. The process of claim 10 wherein said substituted toluene is xylene or halo-toluene.

14. The process of claim 11 wherein said substituted toluene is xylene or halo-toluene.

15. In a process for the production of substituted stilbene and substituted bibenzyl from substituted toluene, using elemental sulfur as the coupling agent, at a temperature of from about 250° C. to about the critical temperature of said substituted toluene wherein the ratio of the number of mols of substituted toluene to the number of gram atoms of sulfur is at least about 2:1, the improvement comprising removing the hydrogen sulfide product during the reaction to thereby increase the ratio of substituted stilbene-to-substituted bibenzenyl in the reaction products.

16. The process of claim 15 wherein the ratio of the number of mols of substituted toluene to the number of gram atoms of sulfur is about 4:1 to about 20:1.

17. The process of claim 15 wherein said substituted toluene is xylene or halo-toluene.

18. The process of claim 16 wherein said substituted toluene is xylene or halo-toluene.

References Cited

UNITED STATES PATENTS 2,614,130   10/1952   Pines et al. _____ 260—670

DELBERT E. GANTZ, Primary Examiner

C. R. DAVIS, Assistant Examiner

U.S. Cl. X.R.

260—650, 668